(12) United States Patent
Brant et al.

(10) Patent No.: US 8,219,667 B2
(45) Date of Patent: Jul. 10, 2012

(54) AUTOMATED IDENTIFICATION OF COMPUTING SYSTEM RESOURCES BASED ON COMPUTING RESOURCE DNA

(75) Inventors: Charles D. Brant, Raleigh, NC (US); Esther M. Burwell, Durham, NC (US); Robert L. Orr, Raleigh, NC (US); Troy M. Volin, Chapel Hill, NC (US); Douglas A. Wood, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 945 days.

(21) Appl. No.: 12/238,209

(22) Filed: Sep. 25, 2008

(65) Prior Publication Data

US 2010/0077401 A1 Mar. 25, 2010

(51) Int. Cl.
*G06F 15/173* (2006.01)
(52) U.S. Cl. ........................................................ 709/224
(58) Field of Classification Search .................. None
See application file for complete search history.

(56) References Cited

U.S. PATENT DOCUMENTS

| | | | | | |
|---|---|---|---|---|---|
| 5,659,731 | A * | 8/1997 | Gustafson | | 1/1 |
| 5,758,322 | A * | 5/1998 | Rongley | | 704/275 |
| 6,988,134 | B2 * | 1/2006 | Thorpe et al. | | 709/223 |
| 7,461,155 | B2 * | 12/2008 | Reisman | | 709/227 |
| 7,519,954 | B1 * | 4/2009 | Beddoe et al. | | 717/124 |
| 2002/0143860 | A1 * | 10/2002 | Catan | | 709/203 |
| 2004/0025162 | A1 * | 2/2004 | Fisk | | 718/105 |
| 2004/0230681 | A1 * | 11/2004 | Strassner et al. | | 709/226 |
| 2005/0119905 | A1 * | 6/2005 | Wong et al. | | 705/1 |
| 2006/0036405 | A1 * | 2/2006 | Byrd et al. | | 702/186 |
| 2006/0037022 | A1 * | 2/2006 | Byrd et al. | | 718/104 |
| 2006/0047805 | A1 * | 3/2006 | Byrd et al. | | 709/224 |
| 2006/0064619 | A1 * | 3/2006 | Wen et al. | | 714/734 |
| 2006/0136585 | A1 * | 6/2006 | Mayfield et al. | | 709/224 |
| 2006/0218155 | A1 * | 9/2006 | Fisher et al. | | 707/100 |
| 2007/0050757 | A1 * | 3/2007 | van Woerkom et al. | | 717/117 |
| 2008/0313331 | A1 * | 12/2008 | Boykin et al. | | 709/226 |
| 2010/0083251 | A1 * | 4/2010 | McCrory et al. | | 718/1 |
| 2010/0161577 | A1 * | 6/2010 | Morozov | | 707/705 |

* cited by examiner

*Primary Examiner* — Keith Vicary
(74) *Attorney, Agent, or Firm* — Patents On Demand; Brian K. Buchheit; Scott M. Garrett (57) ABSTRACT

Computing resource DNA associated with a computing resource of a computing system can be received. The computing resource DNA can include one or more computing resource DNA elements representing identifying characteristics of the computing resource. A set of one or more potential matches for the received computing resource DNA can be ascertained from a set of reference data. When one or more potential matches exist, a confidence factor can be calculated for each potential match. The set of potential matches can then be refined. An optimum match for the computing resource DNA can be determined from the set of refined potential matches. The computing resource DNA can then be identified as a representation of the computing resource associated with the optimum match.

16 Claims, 5 Drawing Sheets

Example DNA Consolidation 500

AUTOMATED IDENTIFICATION OF COMPUTING SYSTEM RESOURCES BASED ON COMPUTING RESOURCE DNA

BACKGROUND

The present invention relates to the field of computing resource identification and, more particularly, to a technique for granular identification of computing resources based on computing resource DNA.

Computing systems often include a wide variety of software and hardware topologies and technologies, such as virtual machines and distributed architectures. These complex configurations result in the same physical component, called a computing resource, being referenced by other software and hardware in the computing system in different manners. For example, a network hub may reference a desktop computer by its Media Access Control (MAC) address, whereas a Web service may reference the same desktop computer by its Internet Protocol (IP) address.

As such, software applications and hardware devices that handle or monitor the communication traffic are prone to recognizing a single computing resource as multiple, separate computing resources. For example, a load-balancing algorithm may be unable to determine the actual load of a server that is running multiple virtual machines because message traffic for each virtual machine is recognized as separate physical machines. Thus, the overall performance of the computing system is degraded.

Attempts to overcome this problem revolve around static correlations for a few basic identifying characteristics of the computing resources. While such approaches can help to alleviate this problem, the manpower required for the creation and maintenance of the characteristics and correlations is often prohibitive. That is, these manual attempts are too labor intensive for large and/or complex computing systems.

BRIEF SUMMARY

One aspect of the present invention can include a method for identifying a computing resource of a computing system based on computing resource DNA. Such a method can begin with the receipt of a computing resource DNA associated with a computing resource of a computing system. The computing resource DNA can include one or more computing resource DNA elements representing identifying characteristics of the computing resource. A set of one or more potential matches for the received computing resource DNA can be ascertained from a set of reference data. When one or more potential matches exist, a confidence factor can be calculated for each potential match. The set of potential matches can then be refined. An optimum match for the computing resource DNA can be determined from the set of refined potential matches. The computing resource DNA can then be identified as a representation of the computing resource associated with the optimum match.

Another aspect of the present invention can include a system that can identify a computing resource of a computing system based on computing resource DNA. Such a system can include reference computing resource DNAs, an unidentified computing resource DNA, and a resource identification engine. The reference computing resource DNAs can correspond to the computing resources communicatively coupled within a computing system. Each reference computing resource DNA can consist of one or more computing resource DNA elements that represent identifying characteristics of the computing resource. The unidentified computing resource DNA can describe a computing resource of the computing system using an unrecognized configuration of computing resource DNA elements. The resource identification engine can be configured to determine if the unrecognized configuration of computing resource DNA elements contained within the unidentified computing resource DNA can be an alternate representation of a reference computing resource DNA within the reference computing resource DNAs.

Yet another aspect of the present invention can include a computer program product that identifies a computing resource of a computing system based on computing resource DNA. The computer program product can include a computer usable medium containing embedded computer usable program code. The computer usable program code can be configured to receive computing resource DNA associated with a computing resource of a computing system. The computing resource DNA can include one or more computing resource DNA elements that represent identifying characteristics of the computing resource. The computer usable program code can also be configured to ascertain a set of potential matches for the received computing resource DNA from a set of reference data. When potential matches exist, the computer usable program code can be configured to calculate a confidence factor for each potential match. The computer usable program code can be configured to refine the set of potential matches. The computer usable program code can then be configured to determine an optimum match for the computing resource DNA from the set of potential matches. Then, the computer usable program code can be configured to identify the computing resource DNA as a representation of the computing resource associated with the optimum match.

DETAILED DESCRIPTION

A solution is disclosed herein that can allow for various representations of a specific computing resource within a computing system to be identified as referencing the same computing resource. That is, messages to a computing resource addressed using hardware-focused information and other messages to the same computing resource addressed using software-focused information can be resolved to indicate that the same computing is being referenced. The resolution of these superficially disparate sets of identifying information can utilize computing resource DNA data that can provide an inclusive representation of the identifying characteristics of the computing resource encountered in the various references to the computing resource by the other computing resources of the computing system.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
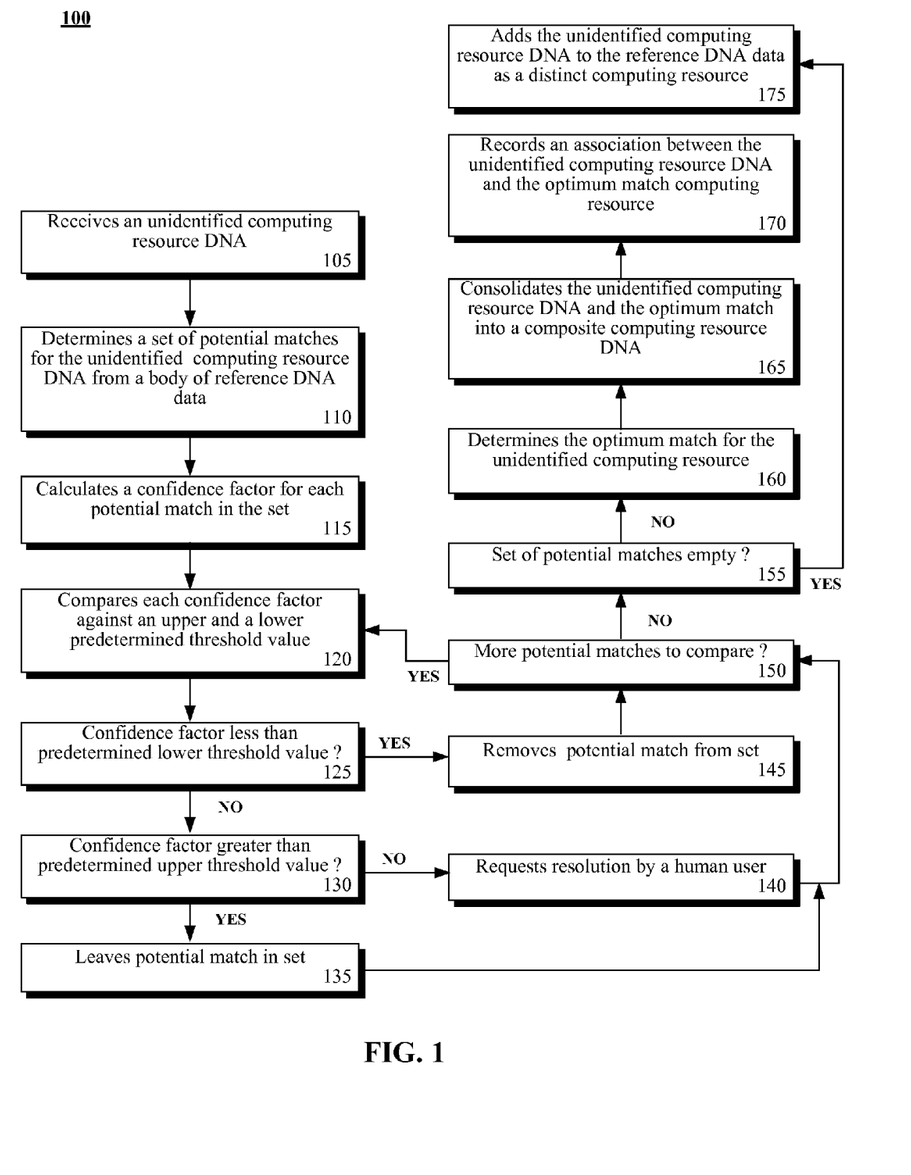
FIG. 1 is a flow chart of a method for identifying a computing resource of a computing system based on computing resource DNA in accordance with embodiments of the inventive arrangements disclosed herein.

Referring now to FIG. 1, FIG. 1 is a flow chart of a method 100 for identifying a computing resource of a computing system based on computing resource DNA in accordance with an embodiment of the inventive arrangements disclosed herein.

As used herein, the term "computing resource" is used to describe a functional component of a computing system that can be referenced by or communicated with other computing resources. Thus, a computing resource can include physical and virtual hardware components, software applications, Web services, and the like.

Additionally, the term "computing resource DNA", as used herein, defines a set of one or more computing resource DNA elements. As used herein, "computing resource DNA elements", herein referred to as DNA elements, represent identifying characteristics of the corresponding computing resource. These identifying characteristics can correspond to a variety of data captured by and/or used within communications by other computing resources of the computing system.

Method 100 can begin with step 105 where an unidentified computing resource DNA can be received for identification. In step 110, a set of potential matches for the unidentified computing resource DNA can be determined from a body of reference computing resource DNA data.

A confidence factor can be calculated for each potential match in step 115. In step 120, each confidence factor can be compared against an upper and lower predetermined threshold value. It can be determined if the confidence factor of the potential match is less than the predetermined lower threshold value in step 125.

When the confidence factor is less than the predetermined lower threshold value, step 145 can execute where the corresponding potential match is removed from the set of potential matches. From step 145, step 150 can execute where it can be determined if more potential matches require confidence factor comparison. When more potential matches require processing, flow can return to step 120.

When the confidence factor is not less than the predetermined lower threshold value, it can be determined if the confidence factor is greater than the predetermined upper threshold value in step 130. When the confidence factor is greater than the predetermined upper threshold value, step 135 can execute where the corresponding potential match is left in the set of potential matches. From step 135, flow can proceed to step 150, where it can be determined if more potential matches require confidence factor comparison.

When the confidence factor is not greater than the predetermined upper threshold value, meaning that the confidence factor is between the predetermined upper and lower threshold values, step 140 can execute where resolution of the indicated potential match can be requested to be performed by a human user. That is, potential matches found to have specified level of ambiguity can be tabled for manual resolution. Because resolution of the potential match is no longer automated, step 140 can include the removal of the potential match from the set of potential matches.

From step 145, flow can proceed to step 150 where it can be determined if more potential matches require confidence factor comparison. When all potential matches in the set have had their confidence factors compared, it can be determined if the set of potential matches is empty in step 155.

It should be noted that step 155 is necessary to ensure that the confidence factor comparison process did not remove all items from the set of potential matches. It is possible for the confidence factors of the potential matches to result in the removal or tabling of all potential matches in the set.

When the set of potential matches is found to be empty, step 175 can execute where the unidentified computing resource DNA can be added to the reference computing resource DNA data as a distinct computing resource. When the set of potential matches is found to contain members, an optimum match for the unidentified computing resource DNA can be determined in step 160. Determination of the optimum match can utilize a variety of techniques, data, and algorithms that can be configured for each computing system.

In step 165, the unidentified computing resource DNA and the data of the optimum match can be consolidated into a composite representation of the computing resource. That is, the library of available data used to reference the computing resource can be expanded to encompass this alternate representation.

An association between the unidentified computing resource DNA and the computing resource of the optimum match can be recorded in step 170. By recording this relationship (i.e., A=B, B=C, etc.), the unidentified computing resource DNA can be identified without performing this in-depth identification process.

It should be highlighted that the process detailed in method 100 provides a level of granularity to the identification of computing resources that is currently lacking in conventional approaches. Additionally, the approach of method 100 eliminates any reliance upon extenuating variables such as communication protocols or environmental variables by incorporating the information of alternate representations of the computing resource into a single item of reference DNA data.

Another point of emphasis is the dynamic capability for method 100 to handle changes in the configuration of the computing resources within the computing system without requiring extensive modifications by users. For example, the addition of new computing resources to the computing system can be processed by method 100, identified as new computing resources, and added to the body of reference DNA data. Conventional identity resolution systems can typically require manual entry of the necessary identifying information prior to the addition of the computing resources to the computing system.

Figure 2:
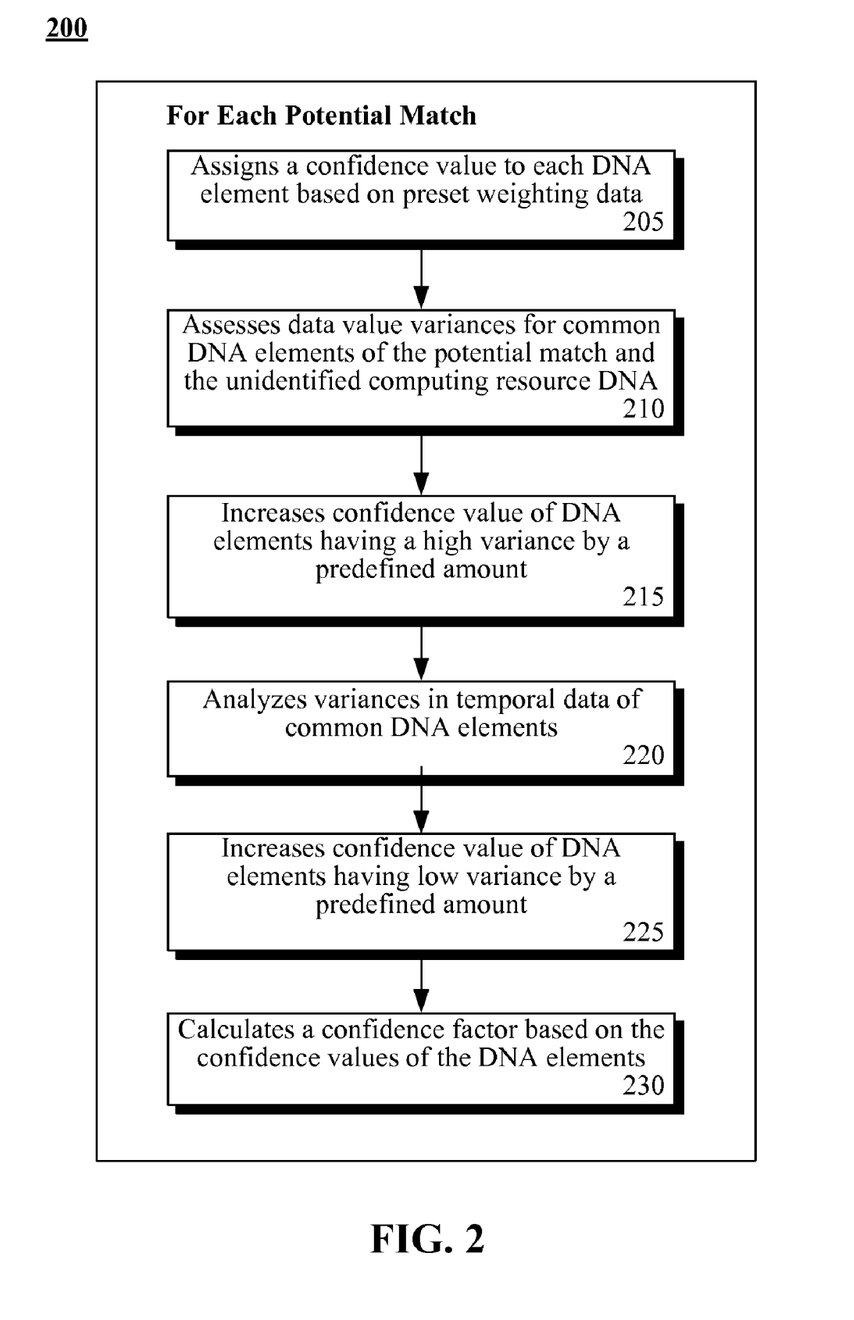
FIG. 2 is a flow chart of a method detailing a specific embodiment for calculating the confidence factor of a potential match for an unidentified computing resource DNA in accordance with an embodiment of the inventive arrangements disclosed herein.

FIG. 2 is a flow chart of a method 200 detailing a specific embodiment for calculating the confidence factor of a potential match for an unidentified computing resource DNA in accordance with an embodiment of the inventive arrangements disclosed herein. Method 200 can describe a specific implementation of the calculation step 115 of method 100 or any other method utilizing confidence factors in the identification of computing resources.

It should be noted that the steps of method 200 are performed for each potential match for the unidentified computing resource DNA. Method 200 can begin with step 205 where a confidence value can be assigned to each computing resource DNA element of the potential match in accordance with preset weighting data.

In step 210, variances in data values for common DNA elements of the potential match and the unidentified computing resource DNA can be assessed. The confidence value of DNA elements determined to have a high variance can be increased by a predefined amount in step 215.

In step 220, common DNA elements can be analyzed for variances in temporal data. The confidence value of DNA elements determined to have a low variance can be increased by a predefined amount in step 225.

It should be noted that the predefined amounts by which confidence values are increased in steps 215 and/or 225 can be implemented on a graduated scale. That is, different ranges of variability can be defined with associated varied amounts by which to increase the confidence value.

Upon completion of the adjustments to the confidence values, step 230 can execute where the confidence factor can be calculated based on the confidence values of the DNA elements.

Figure 3:
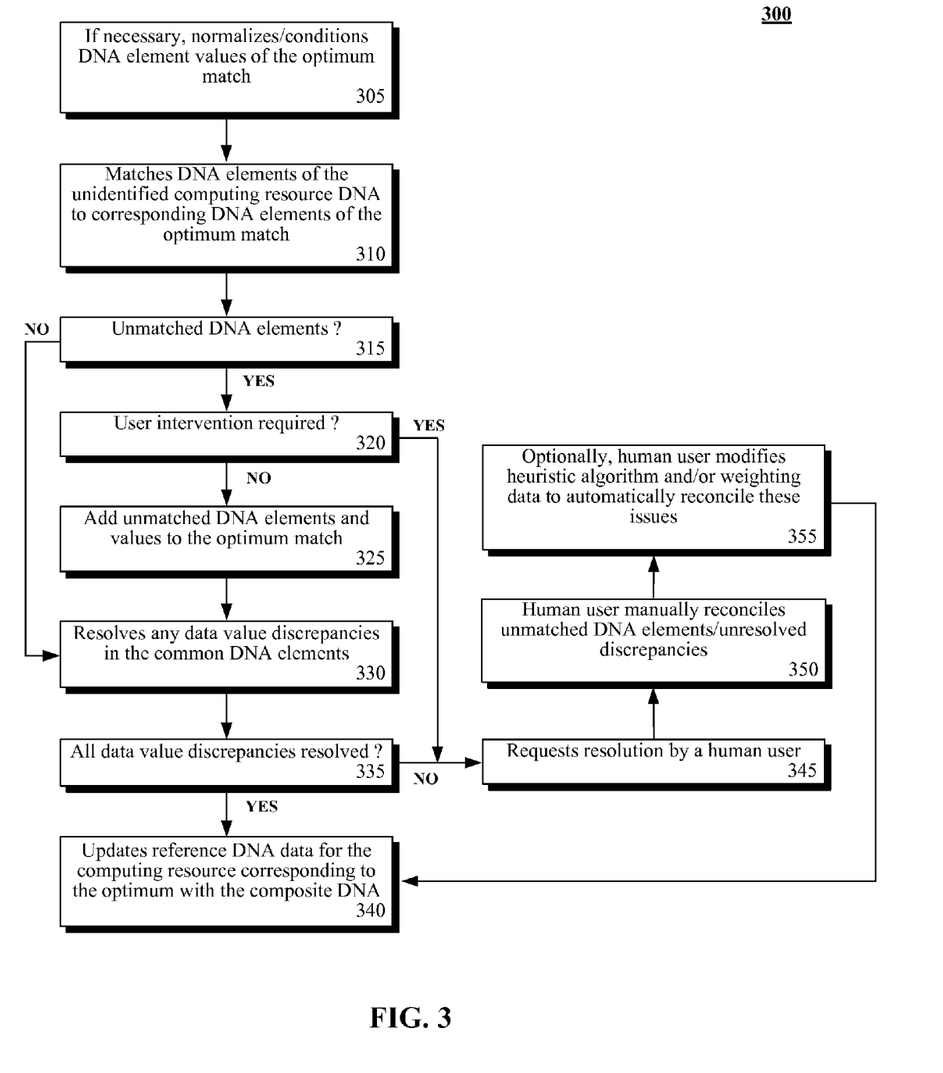
FIG. 3 is a flow chart of a method detailing a specific embodiment for the creation of a composite computing resource DNA from an unidentified computing resource DNA and a determined optimum match in accordance with an embodiment of the inventive arrangements disclosed herein.

FIG. 3 is a flow chart of a method 300 detailing a specific embodiment for the creation of a composite computing resource DNA from an unidentified computing resource DNA and a determined optimum match in accordance with an embodiment of the inventive arrangements disclosed herein. Method 300 can describe a specific implementation of the consolidation step 165 of method 100 or any other method utilizes computing resource DNA for the identification of computing resources.

Method 300 can begin with step 305 where the DNA element values of the optimum match can be normalized and/or conditioned, if necessary. The necessity of step 305 can be triggered in a variety of ways, such as the presence of one or more identified DNA elements within the unidentified computing resource DNA. Normalization and/or conditioning of the data values can be required to ensure the integrity of the data during reconciliation.

In step 310, the DNA elements of the unidentified computing resource DNA can be matched to corresponding DNA elements of the optimum match. The existence of unmatched DNA elements can be determined in step 315.

When unmatched DNA elements are non-existent after the completion of step 310, flow of method 300 can proceed to step 330. When unmatched DNA elements do exist after the completion of step 310, step 320 can execute where it can be determined if the unmatched DNA elements require user intervention.

When it is determined that user intervention is required to handle the unmatched DNA elements, flow of method 300 can be diverted to step 345. When it is determined that user intervention is not required to handle the unmatched DNA elements, step 325 can execute where the unmatched DNA elements and corresponding values can be added to the optimum match.

Upon completion of step 325 or when unmatched DNA elements are not present, step 330 can execute where discrepancies in the values of the common DNA elements can be resolved. It should be noted that step 330 represents an automated resolution of data value discrepancies, and, as such, requires user-defined resolution rules and/or guidelines for proper resolution.

In step 335, it can be determined if all of the data value discrepancies were resolved in step 330. When all data value discrepancies have been resolved, step 340 can execute where the reference DNA data for the computing resource that corresponds to the optimum match is updated with the new composite DNA created by the previously executed steps of method 300.

When unresolved data value discrepancies exist after the completion of step 330 or when user intervention is required to handle unmatched DNA elements, step 345 can execute where resolution of these items by a human user can be requested. In step 350, the human user can manually reconcile the unmatched DNA elements and/or unresolved discrepancies.

In step 355, the human user can optionally modify the heuristic algorithm and/or weighting data to automatically reconcile these issues in the future. Upon completion of step 355, step 340 can execute where the reference DNA data for the computing resource that corresponds to the optimum match is updated with the new composite DNA created by the previously executed steps of method 300.

Figure 4:
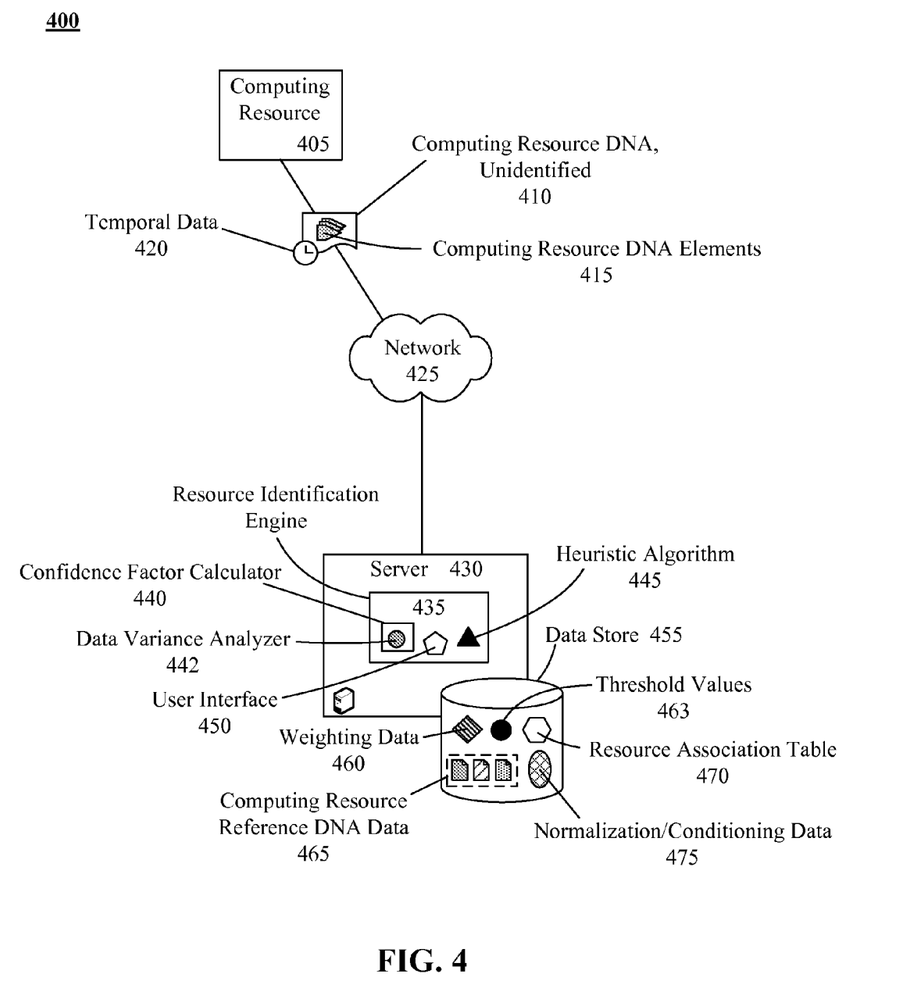
FIG. 4 is a schematic diagram illustrating a computing system for identifying a computing resource based on computing resource DNA in accordance with an embodiment of the inventive arrangements disclosed herein.

FIG. 4 is a schematic diagram illustrating a computing system 400 for identifying a computing resource 405 based on computing resource DNA 410 in accordance with embodiments of the inventive arrangements disclosed herein. Computing system 400 can execute the steps of method 100, 200, and/or 300. In computing system 400, the resource identification engine 435 can determine if the unidentified computing resource DNA 410 is an alternate representation of an existing computing resource 405.

As previously stated, computing resource 405 can correspond to a functional component of computing system 400 that can be referenced by or communicated with other computing resources (not shown). Examples of computing resource 405 can include, but are not limited to, desktop computers, laptop computers, servers, routers, telecommunication devices, printers, virtual machines, software applications, Web services, and the like.

The computing resource 405 can communicate computing resource DNA 410 over a network 425. The computing resource DNA 410 can represent a specific identification of or reference to the computing resource 405. The information contained within computing resource DNA 410 can be similar to or extracted from existing messaging traffic that occurs between the computing resources 405 of a computing system 400.

The computing resource DNA 410 can include one or more computing resource DNA elements 415 and temporal data 420. The temporal data 420 can be a value representing the time and/or date at which the computing resource DNA 410 was created or sent.

The computing resource DNA elements 415 can correspond to a variety of identifying characteristics associated with the computing resource 405. Identifying characteristics represented by computing resource DNA elements 415 can include, but are not limited to, a resource name, a Media Access Control (MAC) address, an Internet Protocol (IP) address, a domain name, an operating system version, a session identifier, a serial number, and the like.

It should be emphasized that multiple configurations of computing resource DNA 410 can exist for an individual computing resource 405. These configurations can represent the different ways various hardware, middleware, and/or software components of the computing system 400 reference or identify the computing resource 405. For example, a hardware component may reference the computing resource 405 by its MAC address, whereas a Web service may use an IP address for identification.

It should also be noted that the computing resource DNA 410 shown in computing system 400 is classified as "unidentified". This additional classification is used to denote that this specific computing resource DNA 410 contains a configuration of computing resource DNA elements 415 that is unrecognized by the resource identification engine 435.

The computing resource DNA 410 can be communicated to the resource identification engine 435 over a network 425. The resource identification engine 435 can represent a software component running on a server 430 of the computing system 400 configured to determine if unidentified computing resource DNA 410 configurations represent existing computing resources 405.

To accomplish this task, the resource identification engine 435 can include a confidence factor calculator 440, a heuristic algorithm 445, a user interface 450, and a data store 455. The data store 455 can contain weighting data 460, threshold values 463, computing resource reference DNA data 465, a resource association table 470, and normalization/conditioning data 475.

In an alternate embodiment, resource identification engine 435 can include a computing resource DNA generator (not shown) capable of extracting data from messaging traffic to populate computing resource DNA elements 415 for the computing resource DNA 410 for a computing resource 405.

When the resource identification engine 435 receives computing resource DNA 410, the resource association table 470 can be checked to determine if the computing resource DNA 410 has already been identified, and, therefore, related to an existing computing resource reference DNA data 465, or if the computing resource DNA 410 is unidentified. The resource association table 470 can contain data that correlates the various computing resource DNA 410 configurations for the same computing resource 405. For example, the resource association table 470 can state that Resource A is the same physical machine as Resource B (e.g., A=B, etc.).

In this example, the computing resource DNA 410 is unidentified or does not have a known relationship to an existing computing resource reference DNA 465. Therefore, the resource identification engine 435 can query the available set of computing resource reference DNA data 465 to determine if the computing resource reference DNA data 465 contains any items that may be a potential match for the unidentified computing resource DNA 410.

Should the resource identification engine 435 be unable to find any potential matches for the unidentified computing resource DNA 410 in the computing resource reference DNA data 465, the resource identification engine 435 can conclude that the unidentified computing resource DNA 410 represents a new/distinct computing resource 405 of the computing system 400. The resource identification engine 435 can then add the unidentified computing resource DNA 410 to the computing resource reference DNA data 465 for use in the identification of other unidentified computing resource DNAs 410.

It should be emphasized that the contents of the computing resource reference DNA data 465 is dynamically and automatically modified to reflect the composition of the computing system 400. Further, in the event of an erroneous addition to the computing resource reference DNA data 465, the normal operation of the resource identification engine 435 can request user assistance to resolve irregularities.

Potential matches found within the computing resource reference DNA 465 can be further processed by the resource identification engine 435. The confidence factor calculator 440 can be a component of the resource identification engine 435 configured to calculate a confidence factor for each potential match, such as by the execution of method 200. The confidence factor can be a quantitative representation of the similarity between the unidentified computing resource DNA 410 and the potential match.

Calculation of a confidence factor can utilize the weighting data 460. The weighting data 460 can represent a set of predefined, user-specified data that quantitatively expresses the importance of a computing resource DNA element 415. For example, the presence of an IP address DNA element 415 can imply a greater amount of confidence than the presence of a hard drive size DNA element 415.

The weighting data 460 can be further expanded to incorporate rules for the application of the weighting data 460 to specific values of the computing resource DNA elements 415. For example, a computing resource DNA 410 containing an IP address DNA element 415 whose value is identified as being an internal IP address can be weighted higher than a computing resource DNA 410 having an external IP address value.

The confidence calculator 440 can include a data variance analyzer 442 that can be configured to examine data variances between the unidentified computing resource DNA 410 and the potential matches. The data variance analyzer 442 can be configured to examine the values of DNA elements 415 and the temporal data 420.

The resource identification engine 435 can compare the confidence factors determined by the confidence factor calculator 440 against the predefined threshold values 463. The predefined threshold values 463 can represent upper and lower limits for the confidence factors. The resource identification engine 435 can be configured to discard potential matches that do not meet the lower confidence factor threshold value 463 and request user resolution for those potential matches whose confidence factor is between the upper and lower threshold values 463.

Potential matches greater than the upper threshold value 463 can be further processed by the resource identification engine 435. From the remaining potential matches, the resource identification engine 435 can determine the identity of the unidentified computing resource DNA 410.

The unidentified computing resource DNA 410 can then be incorporated into the computing resource reference DNA 465, as in the steps outlined in method 300. Reconciliation of data values associated with common computing resource DNA elements 415 can utilize normalization/conditioning data 475. The normalization/conditioning data 475 can outline general data formatting rules for the data values of the computing resource DNA elements 415, such as the accepted format for date values.

The user interface 450 of the resource identification engine 435 can be a mechanism used by a user (not shown) to configure the operation of the resource identification engine 435 and resolve identified issues. For example, a user can modify the values of weighting data 460 or threshold values 463 to increase the accuracy of the potential matches.

Interaction by the user within the user interface 450 can be used to influence the heuristic algorithm 445. The heuristic algorithm 445 can represent the fundamental approach used by the resource identification engine 435 during operation. A heuristic algorithm 445 is an algorithm designed to determine a best-fit solution in a reasonable amount of time. Therefore, for the resource identification engine 435 to operate in the real-time environment of a live computing system 400, a heuristic algorithm 445 can provide acceptable solutions without incurring an unacceptable degradation in performance.

In another contemplated embodiment, the resource identification engine 435 can be an embedded component of a computing hardware device (not shown) that can monitor messaging traffic of the computing system 400. For example, the resource identification engine 435 can be a component of a router in order to identify computing resources 405 properly for load-balancing purposes.

In an alternate embodiment, the resource identification engine 435 can be embedded within a software component (not shown) that can monitor messaging traffic of the computing system 400. For example, the resource identification engine 435 can be a component of a software firewall application in order to identify computing resources 405 attempting to appear as known computing resources 405.

Figure 5:
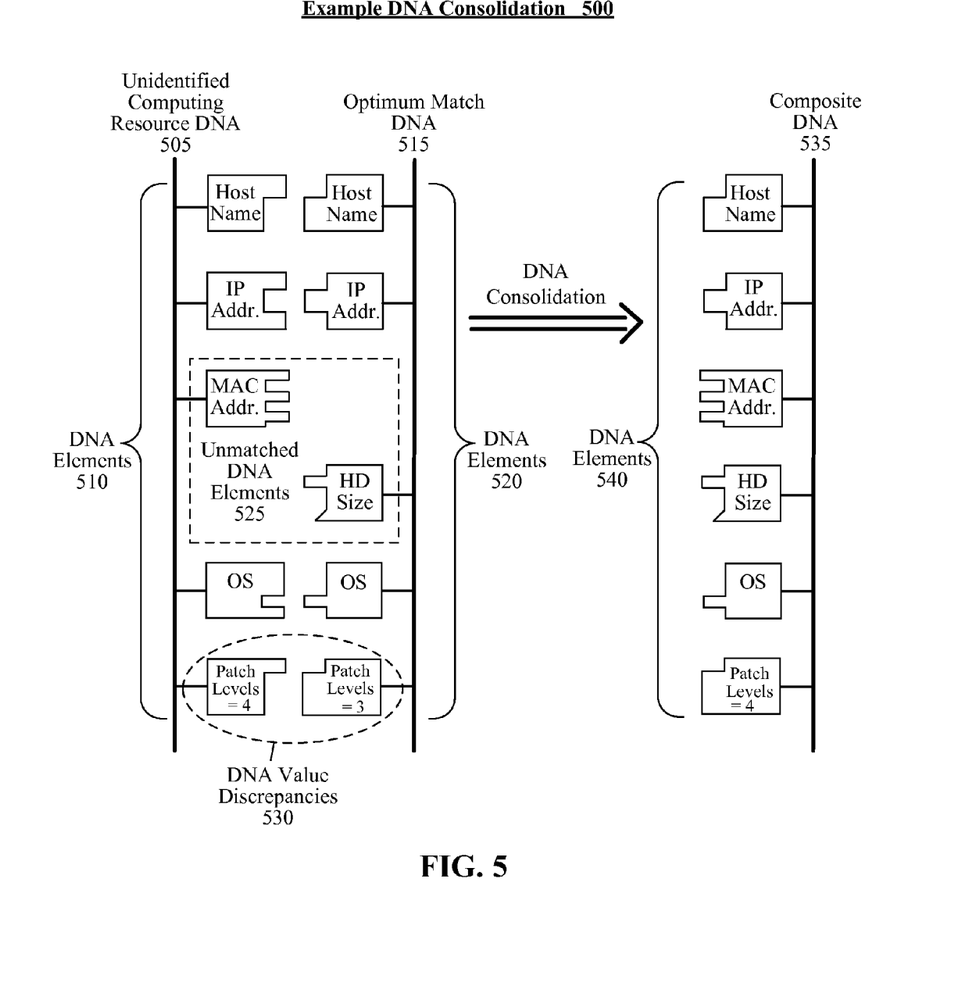
FIG. 5 is a graphical illustration exemplifying the consolidation of an unidentified computing resource DNA with its determined optimum match DNA in accordance with an embodiment of the inventive arrangements disclosed herein.

FIG. 5 is a graphical illustration 500 exemplifying the consolidation of an unidentified computing resource DNA 505 with its determined optimum match DNA 515 by a resource identification engine in accordance with an embodiment of the inventive arrangements disclosed herein. The consolidation shown in illustration 500 can be performed by the resource identification engine 435 of computing system 400 and/or utilizing method 300.

In this example, the resource identification engine has selected optimum match DNA 515 for the unidentified computing resource DNA 505. As such, the unidentified computing resource DNA 505 and the optimum match DNA 515 can be consolidated to create a composite DNA 535.

Unidentified computing resource DNA 505 can contain DNA elements 510, and optimum match DNA 515 can contain DNA elements 520. The DNA elements 510 and 520 can be examined to find commonalities. Either or both DNAs 505 and 515 can be found to contain unmatched DNA elements 525.

An unmatched DNA element 525 can correspond to a DNA element 510 or 520 that only exists in one of the DNAs 505 or 515. As shown in this example, the MAC address DNA element 510 is only present in the unidentified computing resource DNA 505, and the hard drive size DNA element 520 only exists in the optimum match DNA 515.

Creation of the composite DNA 535 can require resolution of these unmatched DNA elements 525. Resolution of the unmatched DNA elements 525 can be automated by including rules and/or logic within the resource identification engine. Otherwise, resolution can be performed manually by a user.

Common DNA elements 510 and 520 can be inspected to identify the existence of DNA value discrepancies 530. As shown in this example, a Patch Levels DNA element 510 and 520 is common to the unidentified computing resource DNA 505 and the optimum match DNA 515. However, the values of the Patch Levels DNA element 510 and 520 are disparate.

As with the unmatched DNA elements 525, resolution of the DNA value discrepancies 530 can be automated and/or manual. Resolution of data value discrepancies 530 can utilize temporal data (not shown) associated with the unidentified computing resource DNA 505 and the optimum match DNA 515. For example, an automated rule can state that the value of the most recently captured DNA element should take precedence.

Once all unmatched DNA elements 525 and DNA value discrepancies 530 have been resolved, the composite DNA 535 can be created. The composite DNA 535 can contain DNA elements 540 that encompass the DNA elements 510 and 520 of the original DNAs 505 and 515.

As shown in this example, both unmatched DNA elements 525 are included within the DNA elements 540 of the composite DNA 535. Additionally, the DNA value discrepancy for the Patch Levels DNA element 540 is also resolved within the composite DNA 535. The composite DNA 535 can then be used to replace the optimum match DNA 515 within the computing resource reference DNA data.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for identifying computing system resources comprising:

at least one computing device receiving a computing resource DNA associated with a computing resource of a computing system, wherein said computing resource DNA comprises a plurality of computing resource DNA elements, wherein each computing resource DNA element corresponds to at least one identifying characteristic of the computing resource;

the at least one computing device ascertaining an existence of a set of at least one potential match for the received computing resource DNA from a set of at least one reference data;

the at least one computing device, when the set of at least one potential match exists, calculating a confidence factor for the at least one potential match, wherein calculating the confidence factor further comprises:

the at least one computing device assigning a confidence value to each computing resource DNA element of each potential match in the set of at least one potential match, wherein said confidence value is influenced by predefined weighting data;

the at least one computing device determining variances in data values and temporal data for computing resource DNA elements present within both the received computing resource DNA and each potential match; and the at least one computing device increasing the confidence value of the computing resource DNA elements whose determined variances meet predetermined variance threshold values;

the at least one computing device refining the set of at least one potential match based at least on the confidence factor;

the at least one computing device determining an optimum match for the computing resource DNA from the set of at least one potential match; and the at least one computing device identifying the computing resource DNA as a representation of a computing resource associated with the optimum match.

2. The method of claim 1, further comprising:

the at least one computing device recording a relationship between the computing resource associated with the received computing resource DNA and the computing resource associated with the optimum match; and the at least one computing device creating a composite computing resource DNA that encompasses data from both the received computing resource DNA and the optimum match, wherein said composite computing resource DNA replaces the optimum match within the set of at least one reference data, and wherein said composite computing resource DNA represents a universal definition of the computing resource corresponding to the received computing resource DNA and the optimum match.

3. The method of claim 2, wherein creating the composite computing resource DNA further comprises:

the at least one computing device identifying each computing resource DNA element of the received computing resource DNA and the optimum match as one of paired and unpaired, wherein a computing resource DNA element identified as paired is present within both the received computing resource DNA and the optimum match;

the at least one computing device analyzing data values of each pair of computing resource DNA elements identified as paired for discrepancies; and the at least one computing device executing a resolution procedure for computing resource DNA elements identified as unpaired and for computing resource DNA elements identified as paired that have data value discrepancies.

4. The method of claim 3, wherein the resolution procedure comprises at least one of an automated resolution algorithm and a request for resolution by a human user.

5. The method of claim 1, wherein refining the set of at least one potential match further comprises:
the at least one computing device comparing the confidence factor of each potential match against predefined values for an upper confidence factor limit and a lower confidence factor limit;
the at least one computing device, when the result of said comparison indicates that the confidence factor of a potential match is below the lower confidence factor limit, automatically removing said potential match from the set of at least one potential match; and
the at least one computing device, when the result of said comparison indicates that the confidence factor of the potential match is between the upper confidence factor limit and the lower confidence factor limit, requesting a manual resolution of said potential match.

6. The method of claim 1, further comprising:
when the set of at least one potential match is non-existent, adding the computing resource DNA to the reference data, whereby new computing resources of the computing system are dynamically incorporated into the reference data.

7. The method of claim 1, wherein the at least one identifying characteristics comprise at least one of a resource identifier, a Media Access Control (MAC) address, an Internet Protocol (IP) address, a domain name, an operating system version, a session identifier, and a serial number.

8. The method of claim 1, wherein the ascertaining of the existence of the set of at least one potential match, the refining the set of at least one potential match, and the determining the optimal match for the computing resource DNA are heuristically performed.

9. The method of claim 1, wherein determining the optimum match for the computing resource utilizes the calculated confidence factors, field intersection data, and weighting data to determine the optimum match.

10. A system for identifying computing system resources based on computing resource DNA comprising:
a plurality of reference computing resource DNAs corresponding to a plurality of computing resources communicatively coupled within a computing system comprising hardware, wherein each reference computing resource DNA comprises a plurality of computing resource DNA elements, wherein the plurality of computing resource DNA elements correspond to identifying characteristics of a computing resource;
an unidentified computing resource DNA describing a computing resource of the computing system with an unrecognized configuration of computing resource DNA elements;
a confidence factor calculator, implemented in computer usable program code stored within and executed by hardware, configured to calculate a confidence factor for at least one reference computing resource DNA;
a resource identification engine, implemented in computer usable program code stored within and executed by hardware, configured to utilize a heuristic algorithm to determine if the unrecognized configuration of computing resource DNA elements contained within the unidentified computing resource DNA is an alternate representation of a reference computing resource DNA within the plurality of reference computing resource DNAs, based at least on the confidence factor; and
a data variance analyzer, implemented in computer usable program code stored within and executed by hardware, configured to assess variances in data values for at least one of computing resource DNA elements common to both the at least one reference computing resource DNA and the unidentified computing resource DNA and temporal data associated with each of the at least one reference computing resource DNA and the unidentified computing resource DNA, wherein variances in said data values alter a calculated confidence factor of the reference computing resource DNA.

11. The system of claim 10, wherein the resource identification engine further comprises:
a plurality of weighting data containing predefined user-specified values, wherein said predefined user-specified values quantitatively represent an importance of a reference computing resource DNA element;
the confidence factor calculator, implemented in computer usable program code stored within and executed by hardware, configured to utilize the plurality of weighting data to calculate confidence factors for the at least one reference computing resource DNA, wherein the at least one reference computing resource DNA is identified as being a potential match for the unidentified computing resource DNA, wherein said confidence factor quantitatively represents a degree of similarity between the at least one reference computing resource DNA and the unidentified computing resource DNA; and
a user interface configured to enable user-configuration of the resource identification engine.

12. The system of claim 10, wherein the resource identification engine is a component of a computing device, wherein said computing device is configured to monitor communications of the computing system.

13. A computer program product that identifies computing system resources based on computing resource DNA comprising:
a non-transitory computer usable medium having computer usable program code embodied therewith, the computer usable program code comprising:
computer usable program code configured to receive a computing resource DNA associated with a computing resource of a computing system, wherein said computing resource DNA comprises a plurality of computing resource DNA elements, wherein each computing resource DNA element corresponds to at least one identifying characteristic of the computing resource;
computer usable program code configured to ascertain an existence of a set of at least one potential match for the received computing resource DNA from a set of at least one reference data;
computer usable program code configured to calculate a confidence factor for the at least one potential match when the set of at least one potential match exists, wherein the confidence factor is calculated by:
assigning a confidence value to each computing resource DNA element of each potential match in the set of at least one potential match, wherein said confidence value is influenced by predefined weighting data;
determining variances in data values and temporal data for computing resource DNA elements present within both the received computing resource DNA and each potential match; and increasing the confidence value of the computing resource DNA elements whose determined variances meet predetermined variance threshold values;
computer usable program code configured to refine the set of at least one potential match based at least on the confidence factor;
computer usable program code configured to determine an optimum match for the computing resource DNA from the set of at least one potential match; and
computer usable program code configured to identify the computing resource DNA as a representation of a computing resource associated with the optimum match.

14. The computer program product of claim 13, further comprising:
computer usable program code configured to record a relationship between the computing resource associated with the received computing resource DNA and the computing resource associated with the optimum match; and
computer usable program code configured to create a composite computing resource DNA that encompasses data from both the received computing resource DNA and the optimum match, wherein said composite computing resource DNA replaces the optimum match within the set of at least one reference data, and wherein said composite computing resource DNA represents a universal definition of the computing resource corresponding to the received computing resource DNA and the optimum match.

15. The computer program product of claim 14, wherein computer usable program code that creates the composite computing resource DNA further comprises:
computer usable program code configured to identify each computing resource DNA element of the received computing resource DNA and the optimum match as one of paired and unpaired, wherein a computing resource DNA element identified as paired is present within both the received computing resource DNA and the optimum match;
computer usable program code configured to analyze data values of each pair of computing resource DNA elements identified as paired for discrepancies; and
computer usable program code configured to execute a resolution procedure for computing resource DNA elements identified as unpaired and for computing resource DNA elements identified as paired that have data value discrepancies.

16. The computer program product of claim 13, further comprising:
computer usable program code configured to add the computing resource DNA to the set of at least one reference data when the set of at least one potential match is non-existent, whereby new computing resources of the computing system are dynamically incorporated into the set of at least one reference data.

* * * * *